Jan. 11, 1949.                J. F. MURPHY                 2,458,524
                                PUNCH JIG
Filed Dec. 14, 1945                                    2 Sheets-Sheet 1

INVENTOR.
James F. Murphy
BY
ATTORNEY.

Jan. 11, 1949. J. F. MURPHY 2,458,524
PUNCH JIG
Filed Dec. 14, 1945 2 Sheets-Sheet 2

INVENTOR.
James F. Murphy
BY
M. O. Hayes
ATTORNEY.

Patented Jan. 11, 1949

2,458,524

UNITED STATES PATENT OFFICE 2,458,524

PUNCH JIG

James F. Murphy, Philadelphia, Pa.

Application December 14, 1945, Serial No. 635,133

4 Claims. (Cl. 164—59)

(Granted under the act of March 3, 1883, as amended April 30, 1928; 370 O. G. 757)

The present invention relates to a jig and has special reference to a jig designed to be mounted in a punch press for use in guiding and punching metal strips or straps.

More particularly this invention relates to a jig having guides therein that can be adjusted to center strips of various widths over the die so that the holes will be in the center of the strip. The guides are arranged to contact positively both sides of the strip at all times irrespective of any deviation in the width of the strip such as can result from shearing or other causes.

An object of this invention is to provide a jig adapted to be used in a punch press for guiding metal strips or straps to be punched.

Another object is to provide such a jig having guides therein that can be adjusted to handle strips of various widths and that, when adjusted, will engage positively the sides of the strips irrespective of variations in the width thereof.

A still further object is to provide a jig of the type above described that is strong, durable and of simple construction.

Further objects and advantages of this invention, as well as its construction, arrangement and operation, will be apparent from the following description and claims in connection with the accompanying drawings, in which Fig. 1 is an isometric partially exploded view of a jig embodying the present invention;

Figure 1:
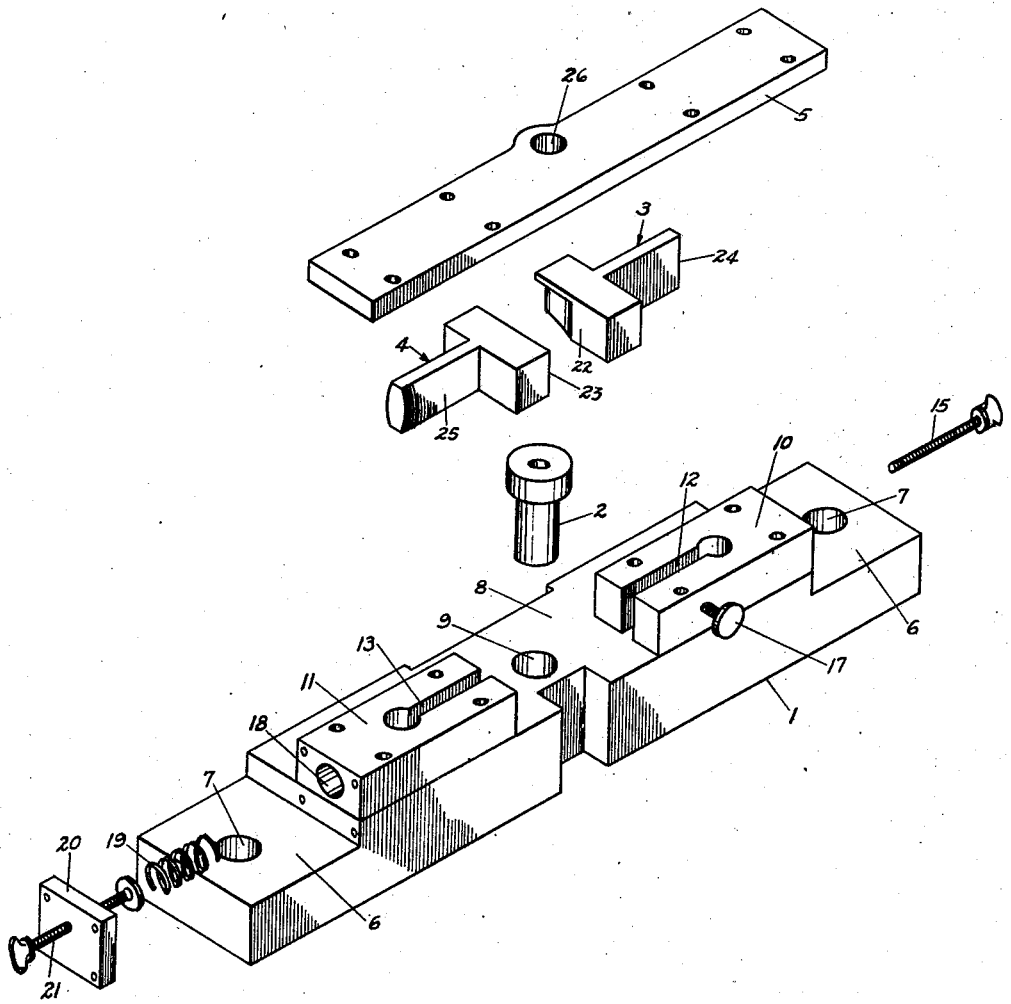
Figure 2:
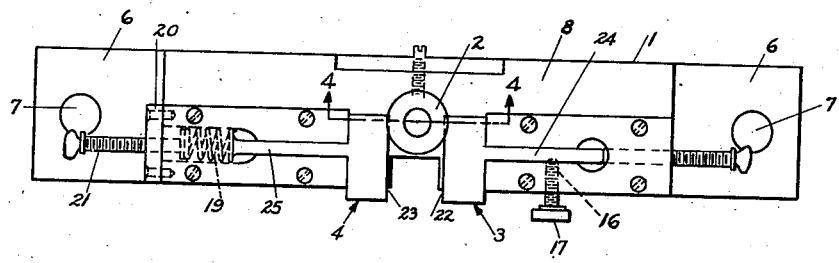
Fig. 2 is a top plan view of the jig with the stripper plate removed.
Figure 3:
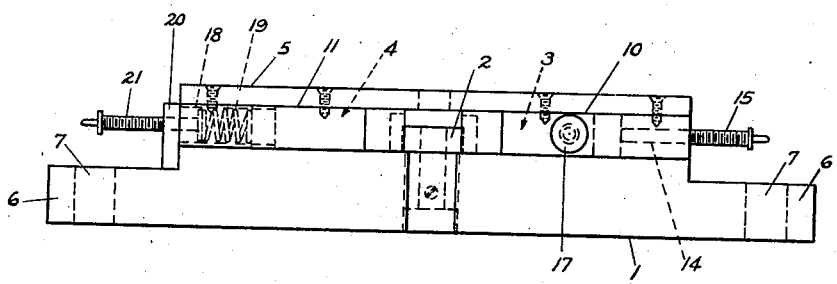
Fig. 3 is a side elevational view of the jig.
Figure 4:
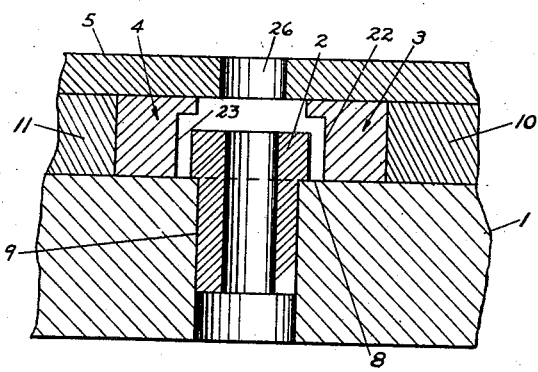
Fig. 4 is a vertical cross sectional view taken on the line 4—4 of Fig. 2.

A jig embodying the present invention includes a base 1, a die 2, guide members 3 and 4, and a stripper plate 5.

The base 1 which is preferably formed integrally, is provided with reduced end portions 6 having bores 7 extending therethrough for receiving bolts or other suitable means to secure the base 1 in a punch press. Above the reduced end portions 6 is a surface 8 with a bore 9 extending from the surface through the base for the reception of the shank of the die 2. On opposite sides of the die, upwardly projecting guide-holders 10 and 11 are mounted, said guide-holders forming a passageway for the strip between the opposed faces thereof. Slots 12 and 13 formed in the guide-holders 10 and 11 extend outwardly from the opposed faces of the guide-holders. A tapped hole 14 aligned with the slot 12 extends from the outer end of the guide-holder 10 and connects with the slot 12. Threaded in the tapped hole 14 is an adjusting screw 15. Extending in from one side of the guide holder 10 and connecting with the slot 12 is a tapped bore 16 in which a lock-screw 17 is threaded.

The guide-holder 11 is provided with an enlarged bore 18 that extends inwardly from the outer end thereof and connects with the slot 13. Positioned in the enlarged bore 18 is a coil spring 19. A cover plate 20 is mounted over the outer end of the guide-holder 11 and an adjusting screw 21 having a disc on the inner end is threaded in the plate 20 and abuts the outer end of the coil spring 19.

The guides 3 and 4 comprise bearing portions 22 and 23 and stems 24 and 25, which are substantially normal to the bearing portions. The guides are mounted in the guide-holders 10 and 11 of the base with the stems lying in the slots 12 and 13. The outer end of the stem 25 is enlarged for engaging the inner end of the spring 19. With the guides 3 and 4 mounted in the guide-holders 10 and 11, the bearing portions 22 and 23 of the guides are substantially adjacent the die 2. The bearing surface of each of the guides 3 and 4 is flared outwardly toward the receiving end thereof. The stripper plate 5 is secured to the upper surface of the guide-holders 10 and 11 with the punch opening 26 therein above the die 2.

In operation, the jig is placed in a punch press with the die 2 in alignment with the punch. Adjusting screw 15 is then actuated to position the bearing portion of the guide 3 a distance from the center of the die equal to one-half the width of the strip or strap to be punched. The lock-screw 17 is then tightened to lock the guide 3 in this position. The adjusting screw 21 in the guide-holder 11 is also adjusted to provide the proper tension on the spring 19 to maintain the guide 4 against the opposite side of the strip to be punched. Thus, as the strip is fed between the guides, the guide 4 urges it against the guide 3 so that the center of the strip passes directly over the die 2. However, when any irregularities in the width of the strip are encountered, such as can be caused by the sheared ends thereof, the guide 4 moves outwardly to permit the strip to pass between the guides.

A jig of the type above described handles strips of varying widths, it being only necessary to set the guide 3 for each width of strip and keep a proper tension on the spring 19. Once the guide 3 has been adjusted for a strip of a certain width, no further adjustments are necessary until strips of different widths are to be fed through the jig.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A jig adapted to be used in a punch press for guiding and punching a metal strip, comprising a base, a die mounted in said base over which said strip passes, a pair of oppositely disposed guide-holders mounted on said base adjacent said die, said guide-holders having slots extending outwardly from the opposed faces thereof substantially normal to the path of travel of said strip, a guide movably mounted in each of said slots for guiding said strip, said guides being flared outwardly at the receiving ends thereof, means for fixedly adjusting one of said guides, and resilient means for urging the second guide toward said first guide.

2. A jig adapted to be used in a punch press for guiding and punching a metal strip, comprising a base, a die mounted in said base over which said strip passes, a pair of oppositely disposed guide-holders mounted on said base adjacent said die, said guide-holders having slots extending outwardly from the opposed faces thereof substantially normal to the path of travel of said strip, a guide movably mounted in each of said slots for guiding said strip, said guides being flared outwardly at the receiving ends thereof, means for fixedly adjusting one of said guides, resilient means for urging the second guide toward said first guide, and a stripper plate having an opening therein for a punch secured on said guide supports over said die.

3. A jig comprising a base, a plurality of oppositely disposed guide-holders mounted on said base, said guide-holders having slots extending outwardly from the opposed faces of said guide-holders at an angle to the path of travel of a workpiece relative said jig, a guide carried in each of said slots and movable in the plane of said guide-holders, means for fixedly adjusting at least one of said guides, and resilient means for urging at least one of said guides toward said fixedly adjusted guide.

4. A jig comprising a base, a plurality of oppositely disposed guide-holders mounted on said base, said guide-holders having slots extending outwardly from the opposed faces of said guide-holders at an angle to the path of travel of a workpiece relative said jig, a guide movably mounted in each of said slots, means for fixedly adjusting at least one of said guides, resilient means for urging at least one of said guides toward said fixedly adjusted guide, and a stripper plate mounted on said guide-holders.

JAMES F. MURPHY.

REFERENCES CITED

The following references are of record in the file of this patent:

UNITED STATES PATENTS

| Number | Name | Date |
| --- | --- | --- |
| 691,234 | Bowen | Jan. 14, 1902 |
| 764,851 | Hutchins | July 12, 1904 |
| 1,118,232 | Rehbein | Nov. 24, 1914 |
| 1,291,524 | Howell | Jan. 14, 1919 |
| 1,547,642 | Casal | July 28, 1925 |
| 1,797,739 | Vold | Mar. 24, 1931 |
| 2,250,530 | Hafecost | July 29, 1941 |
| 2,372,499 | Kerner | Mar. 27, 1945 |